United States Patent
Dvoskin et al.

(10) Patent No.: US 8,843,776 B2
(45) Date of Patent: Sep. 23, 2014

(54) METHOD AND SYSTEM OF REPORTING ELECTRICAL CURRENT TO A PROCESSOR

(75) Inventors: Eugene M. Dvoskin, Broomfield, CO (US); Noel D. Scott, Fort Collins, CO (US); Robert J. Horning, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 563 days.

(21) Appl. No.: 13/147,429

(22) PCT Filed: Feb. 27, 2009

(86) PCT No.: PCT/US2009/035501
§ 371 (c)(1),
(2), (4) Date: Aug. 2, 2011

(87) PCT Pub. No.: WO2010/098769
PCT Pub. Date: Sep. 2, 2010

(65) Prior Publication Data
US 2011/0289337 A1    Nov. 24, 2011

(51) Int. Cl.
*G06F 1/26* (2006.01)
*G06F 1/32* (2006.01)
(52) U.S. Cl.
CPC ........................................ *G06F 1/26* (2013.01)
USPC ............. 713/340; 713/300; 713/320; 714/14; 714/22; 714/721
(58) Field of Classification Search
CPC .. G06F 1/3203; G06F 1/3296; G06F 2217/78
USPC ............... 713/300, 340, 320; 714/14, 22, 721
See application file for complete search history.

(56) References Cited

U.S. PATENT DOCUMENTS

| | | | |
|---|---|---|---|
| 5,777,447 A * | 7/1998 | Okano .......................... | 318/434 |
| 6,304,978 B1 | 10/2001 | Horigan et al. | |
| 6,636,976 B1 | 10/2003 | Grochowski et al. | |
| 6,954,706 B2 | 10/2005 | Poirier et al. | |
| 2004/0003301 A1 | 1/2004 | Nguyen | |
| 2004/0123170 A1 | 6/2004 | Tschanz et al. | |
| 2004/0193926 A1 | 9/2004 | Vogman | |
| 2005/0043909 A1 | 2/2005 | Poirier et al. | |
| 2005/0102114 A1 | 5/2005 | Yasala | |
| 2007/0174641 A1 | 7/2007 | Cornwell et al. | |
| 2008/0168287 A1* | 7/2008 | Berry et al. .................... | 713/323 |

FOREIGN PATENT DOCUMENTS

| | | |
|---|---|---|
| CN | 1588270 | 3/2005 |
| CN | 1598733 | 3/2005 |

OTHER PUBLICATIONS

Eugene Mikhaylovich Dvoskin et al., "Notification of Transmittal of the International Search Report and the Written Opinion of the International Searching Authority, or the Declaration," International Application No. PCT/US2009/035501 (filed Feb. 27, 2009), Date of Mailing: Apr. 8, 2010, pp. 1-10.

* cited by examiner

*Primary Examiner* — Michael J Brown

(57) ABSTRACT

Reporting electrical current to a processor. At least some of the illustrative embodiments are methods including providing operational power to a processor at a voltage indicated by the processor of a computer system, measuring electrical current actually drawn by the processor, and reporting to the processor a value of electrical current drawn by the processor. The value of electrical current reported different than the electrical current actually drawn by more than a measurement error of measuring the electrical current actually drawn.

15 Claims, 4 Drawing Sheets

METHOD AND SYSTEM OF REPORTING ELECTRICAL CURRENT TO A PROCESSOR

BACKGROUND

Processors within electronic devices draw differing amounts of power based on the number and type of tasks being performed. For example, a processor that is mostly idle utilizes less power than a processor that is executing at or near 100% utilization. Moreover, different applications may require different computational effort, and thus even if utilization is held constant, processors executing different applications may draw differing amounts of power.

Some processors have the ability to measure their internal silicon temperatures, and to request particular power supply voltages. When operating below predetermined silicon temperatures, a processor may request higher supply voltage (and increase clocking rate) such that the processor executes instructions more quickly. If silicon temperatures approach predetermined thresholds, the processor requests reduced supply voltage (and likewise decreases clocking frequency). However, even though silicon temperature may be well below the threshold, a processor may limit requested supply voltage (and clocking frequency) to ensure the power draw is within the limits of the voltage regulation circuitry.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Linear-type regulator" shall mean a voltage or current regulator system having a power flow control device (e.g., bipolar junction transistor, field effect transistor) operated in its linear region.

"Switching-type regulator" shall mean a voltage or current regulator system having a power flow control device (e.g., bipolar junction transistor, field effect transistor) operated alternately between an off-state and a fully saturated on-state.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments discussed below are directed to computer systems where circuitry external to the processor measures processor electrical current actually drawn, and reports a value of the electrical current drawn to the processor; however, for reasons discussed more below, the value of electrical current reported to the processor is intentionally different, and in many cases less, than the value of the electrical current actually drawn. The result is an increase in processor performance. The various embodiments were developed in the context of commercial and consumer computer systems, particularly with respect to the main processor of the computer systems, and this specification is related to the developmental context. However, various embodiments of reporting electrical current different than actually drawn may be applicable to any processor, such as a graphics processing unit (GPU), digital signal processor (DSP), floating point unit (FPU), image processor, array processor, microcontroller, or application specific integrated circuit (ASIC).

Figure 1:
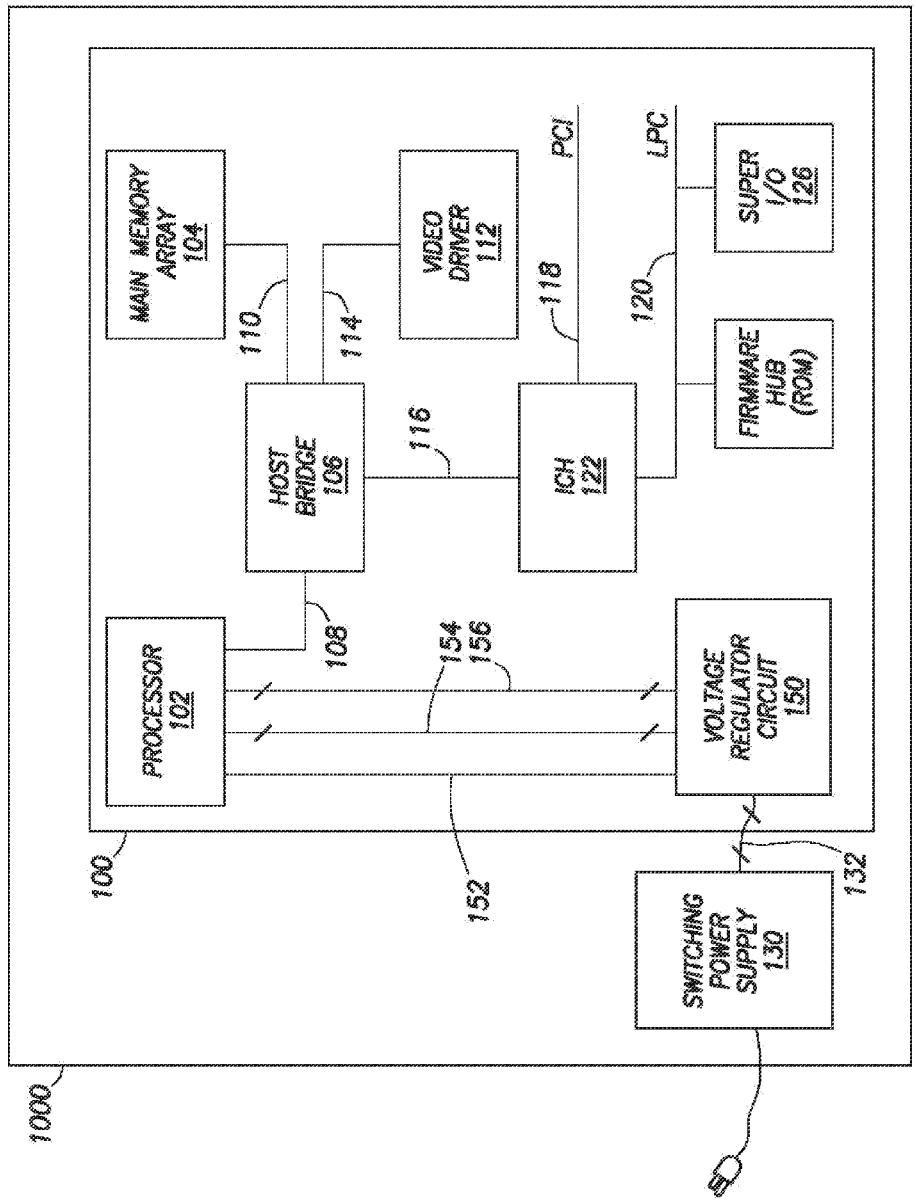
FIG. 1 shows a system in accordance with at least some embodiments.

FIG. 1 illustrates a computer system 1000 constructed in accordance with at least some embodiments. Computer system 1000 comprises a printed circuit board or motherboard 100 upon which various electrical components are coupled. In particular, the motherboard 100 comprises a processor 102. The processor 102 couples to a main memory array 104, and various other peripheral computer system components, through host bridge 106. The processor 102 couples to the host bridge 106 by way of a host bus 108, or the host bridge 106 may be integrated into the processor 102. Thus, the computer system 1000 may implement other bus configurations or bus-bridges, in addition to, or in place of, those shown in FIG. 1.

Main memory array 104 couples to the host bridge 106 through a memory bus 110. The host bridge 106 comprises a memory control unit that controls transactions to the main memory 104 by asserting control signals for memory accesses. The main memory array 104 functions as the working memory for the processor 102 and comprises a memory device or array of memory devices in which programs, instructions and data are stored. The main memory array 104 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM).

In some embodiments the computer system 1000 comprises a graphics controller or video driver 112 that couples to the host bridge 106 by way of a peripheral components interconnect (PCI) Express (PCI-E) bus 114, or other suitable type of bus. Alternatively, the video driver 112 may couple to the primary expansion bus 116 or one of the secondary expansion buses (e.g., PCI bus 118). The video driver 112 may further couple to a display device which may comprise any suitable electronic display device upon which any image or text can be represented. In some embodiments, the video driver 112 is integrated with the motherboard 100, and in other embodiments the video driver 112 is an add-in card that is physically and electrically coupled to the motherboard 100.

Still referring to FIG. 1, the computer system 1000 also comprises a second bridge 122 that bridges the primary expansion bus 116 to various secondary expansion buses, such as the PCI bus 118 and low pin count (LPC) bus 120. In accordance with some embodiments, the bridge 122 comprises an Input/Output Controller Hub (ICH) manufactured by Intel Corporation. In the embodiments shown in FIG. 1, the primary expansion bus 116 comprises a Hub-link bus, which is a proprietary bus of the Intel Corporation. However, computer system 1000 is not limited to a chipset manufactured by Intel, and thus other suitable chipsets, and therefore other suitable buses between the bridge devices, may be equivalently used.

A firmware hub 124 couples to the ICH 122 by way of the LPC bus 120. The firmware hub 124 comprises read-only memory (ROM) which contains software programs executable by the processor 102. The software programs comprise not only programs to implement basic input/output system (BIOS) commands, but also instructions executed during and just after power-on self tests (POST) procedures. The POST procedures perform various functions within the computer system before control of the computer system is turned over to the operating system.

A super input/output (I/O) controller 126 couples to the ICH 122 and controls many computer system functions, for example interfacing with various input and output devices such as a keyboard and a pointing device (e.g., mouse), various serial ports and floppy drives. The super WO controller 126 is often referred to as "super" because of the many I/O functions it performs.

Computer system 1000 further comprises a power supply 130, such as a switching power supply, that electrically couples to the motherboard 100. The power supply 130 produces a variety of power signals with different direct current (DC) voltages, such as +12 Volt (V), −12 V, +5 V, −5V and +3.3V. Although the power supply 130 provides a host of power signals with different voltages, other voltages may be needed on the motherboard 100. For example, some of the integrated circuits on the motherboard 100, such as the processor 102, may operate based on a supply voltages ranging from 0.75 Volts (V) to 1.5V, but the power supply 130 does not provide such a power signal. In order to provide the voltages, the motherboard 100 in accordance with the various embodiments comprises a voltage regulator circuit 150 that couples to one or more power signals provided from the power supply 130 through cable 132.

The voltage regulator circuit 150 receives power from one or more of the power signals (e.g., +12V), and reduces the voltage to a voltage suitable for the processor 102. The voltage regulator circuit 150 may comprise a switching-type regulator, a linear-type regulator, or a combination of the two. The power signal created by the voltage regulator circuit 150 couples to processor 102 by way of a power rail 152. The power signal created by the voltage regulator circuit 150 may also couple to other devices, and/or the voltage regulator circuit 150 may create other power signals that couple to other system devices (e.g., main memory array and the various bridges).

In accordance with the various embodiments, the processor 102 is configured to measure its internal silicon temperatures, and to request particular voltages on the power rail. When operating below predetermined silicon temperatures, the processor 102 may request higher voltage on the power rail 152 (and increase the clocking frequency) such that the processor 102 executes instructions more quickly. If silicon temperatures approach the predetermined thresholds, the processor 102 requests reduced voltage on the power rail 152 (and likewise decreases the clocking frequency). In some embodiments, and depending on the silicon temperatures within the processor 102, the processor 102 sends signal to the voltage regulator circuit 150 requesting a particular voltage in a range of between and including 0.75V to 1.5V.

In order for the processor to send the request, and for the voltage regulator circuit 150 to receive the request, the processor 102 and voltage regulator circuit 150 are communicatively coupled by way of one or more signal lines 154. The signal lines 154 may take many forms. In some cases, a single signal line may couple between the processor 102 and the voltage regulator circuit 150. In the illustrative case of a single signal line, the processor 102 may drive: a direct current (DC) analog signal whose electrical current amplitude is indicative of the requested voltage for the power rail 152; a DC analog signal whose voltage amplitude is indicative of the requested voltage for the power rail 152; and a digital signal comprising a value indicative of the requested voltage for the power rail 152.

In yet still other embodiments, the signal lines 154 may comprise a plurality of signal lines operated as a parallel communication bus. In the illustrative case of a plurality of signal lines, the processor 102 may drive a digital signal comprising a value indicative of the requested voltage for the power rail 152. The voltage regulator circuit 150 receives the signal from the processor indicative of the requested voltages, and provides the requested voltage to the processor 102 on the power rail 152.

Further in accordance with the various embodiments, the processor 102 is configured receive an indication of the electrical current drawn over the power rail 152 by the processor 102 from the voltage regulator circuit 150. In order for the voltage regulator circuit 150 to send the indication of the electrical current drawn, and for the processor 102 to receive the indication, the processor 102 and voltage regulator circuit 150 are also communicatively coupled by way of one or more signal lines 156. The signal lines 156 may take many forms. In some cases, a single signal line may couple between the processor 102 and the voltage regulator circuit 150. In the illustrative case of a single signal line, the voltage regulator circuit 150 may drive: a DC analog signal whose electrical current amplitude is indicative of the electrical current drawn by the processor 102; a DC analog signal whose voltage amplitude is indicative of the electrical current drawn by the processor 102; and a digital signal comprising a value indicative of the electrical current drawn by the processor 102. In yet still other embodiments, the signal lines 156 may comprise a plurality of signal lines operated as a parallel communication bus. In the illustrative case of a plurality of signal lines, the voltage regulator circuit 150 may drive a digital signal comprising a value indicative of the electrical current drawn by the processor 102. The processor 102 may use the value indicative of electrical current drawn, and the known requested voltage on the power rail, to calculate power dissipation by the processor 102.

Even though silicon temperatures for the processor 102 may be well below the threshold, processor 102 may nevertheless limit the requested voltage on the power rail 152 to ensure the power dissipation of the processor 102 is within what the processor 102 believes the voltage regulator circuit 150 can provide. In particular, processor manufacturers publish specifications for power requirements of processors well in advance of the processor's release date. For processors that have the ability to sense silicon temperatures and adjust power rail voltage (and thus power dissipation), the processors are programmed to self limit power dissipation to the maximum power dissipation indicated in published specifications for the particular processor, on the assumption that the voltage regulator circuits cannot provide more power than indicated in the published specifications. However, in many cases the processors can operate at power dissipation levels above, and in some cases well above, the maximum power dissipation indicated in published specifications for the particular processor, so long as the processor does not exceed the silicon temperature thresholds.

In accordance with the various embodiments the voltage regulator circuit 150 has the ability to provide power at levels above the maximum power dissipation indicated in the published specifications. Moreover, while the voltage regulator circuit 150 may measure the amount of electrical current actually drawn by the processor 102, the voltage regulator circuit 150 is configured to send the indication of the electrical current drawn different than the amount of electrical current actually drawn. In particular, in some embodiments the voltage regulator circuit 150 is configured to send the indication of electrical current drawn being lower than the electrical current actually drawn. It is noted that the differences between the indication of electrical current and the electrical current actually drawn are more than just differences caused by variations in component values. For example, reporting electrical current drawn different than electrically current actually drawn based on the resistance of one or more resistors being different than the resistor markings (but within tolerance) does not qualify, for purposes of this disclosure and claims, as sending an indication of the electrical current drawn different than the amount of electrical current actually drawn. As yet another example, reporting electrical current drawn different than electrical current actually drawn based on differences in expected open-loop gain of one or more amplifiers or transistors (but within tolerance) does not qualify, for purposes of this disclosure and claims, as sending an indication of the electrical current drawn different than the amount of electrical current actually drawn.

The indication of electrical current drawn sent to the processor 102 may be over-reported to the processor, or under-reported to the processor. Consider a situation where the processor 102 is operating below threshold silicon temperatures, but is operating at the maximum power dissipation indicated in published specifications. Because the processor 102 is below threshold silicon operating temperatures, the tendency of the processor 102 is to request higher voltages on the power rail 152 (and likewise increase clocking frequency); however, if the processor 102 calculates that the power dissipation is at the maximum power dissipation indicated in published specifications, no further requests for voltage increases on the power rail 152 will be issued by the processor 102.

However, the voltage regulator circuit 150 in accordance with the various embodiments is configured to provide more power than the maximum power dissipation indicated in published specifications. Moreover, because in various embodiments the voltage regulator circuit 150 sends indications of electrical current drawn lower than electrical current actually drawn, the processor 102, calculates that it is operating below the maximum power dissipation limit, and thus request increases in voltage on the power rail 152, and executes the applications more quickly. In this way, the voltage regulator circuit is not underutilized, and the processor 102 is not underutilized. As the silicon temperatures of the processor 102 approach threshold values, the processor 102 reduces power dissipation (by requesting lower voltages on the power rail 152), and thus under-reporting the electrical current by the voltage regulator circuit 150 does not jeopardize the operational integrity of the processor 102.

The difference between the electrical current actually drawn and the electrical current reported to the processor may vary. For example, in some cases the voltage regulator circuit 150 is configured to send a signal to the processor 102 that indicates lower than 95% of the amount of electrical current actually drawn by the processor. Stated oppositely, in some cases the voltage regulator circuit 150 is configured to send a signal to the processor 102 that indicates electrical current drawn that is different by at least 5% of the electrical current actually drawn. In some cases, the voltage regulator circuit 150 is configured to send the signal to the processor 102 that indicates between and including 80% and 85% of the amount of electrical current actually drawn by the processor. Stated oppositely, in some cases the voltage regulator circuit 150 is configured to send a signal to the processor 102 that indicates electrical current drawn that is different by between and including 15% and 20% of the electrical current actually drawn.

Figure 2:
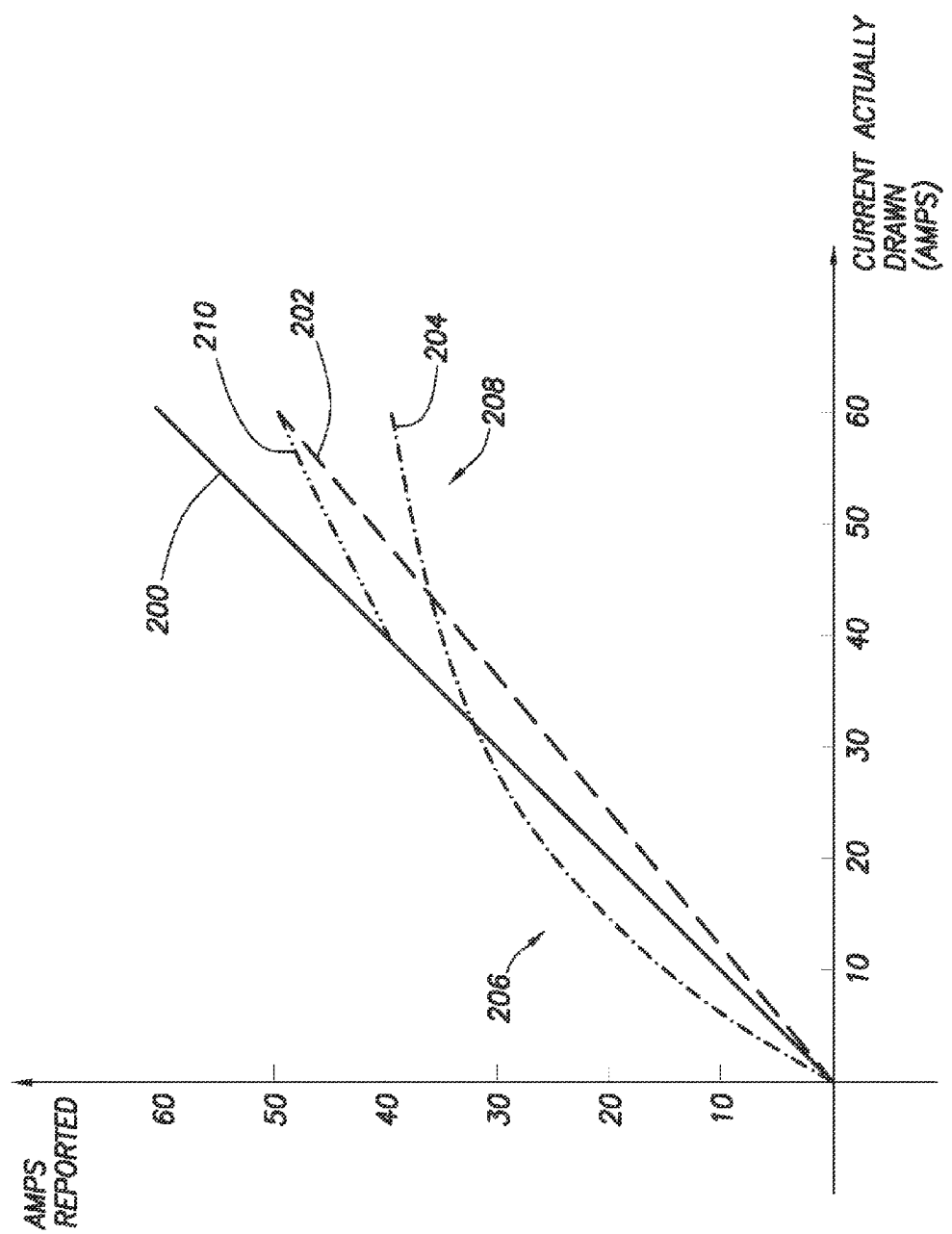
FIG. 2 shows, in graphical form, various relationships of electrical current actually drawn by the processor, and electrical current reported to the processor.

Moreover, the amount that the voltage regulation circuit 150 reports different than the electrical current actually drawn may vary. FIG. 2 illustrates, in graphical form, various relationships between the electrical current actually drawn and values reported to the processor. Solid line 200 represents the case of a one-to-one reporting as a reference. Dashed line 202 represents a "straight line" under-reporting of approximately 17%. Dash-dot-dash line 204 represents a reporting "curve," where (for purposes of illustration) a portion 206 is slightly over-reported, and another portion 208 is under-reported. Dash-dot-dot line 210 represents a one-to-one reporting to a particular value, and then an increasing under-reporting.

Figure 3:
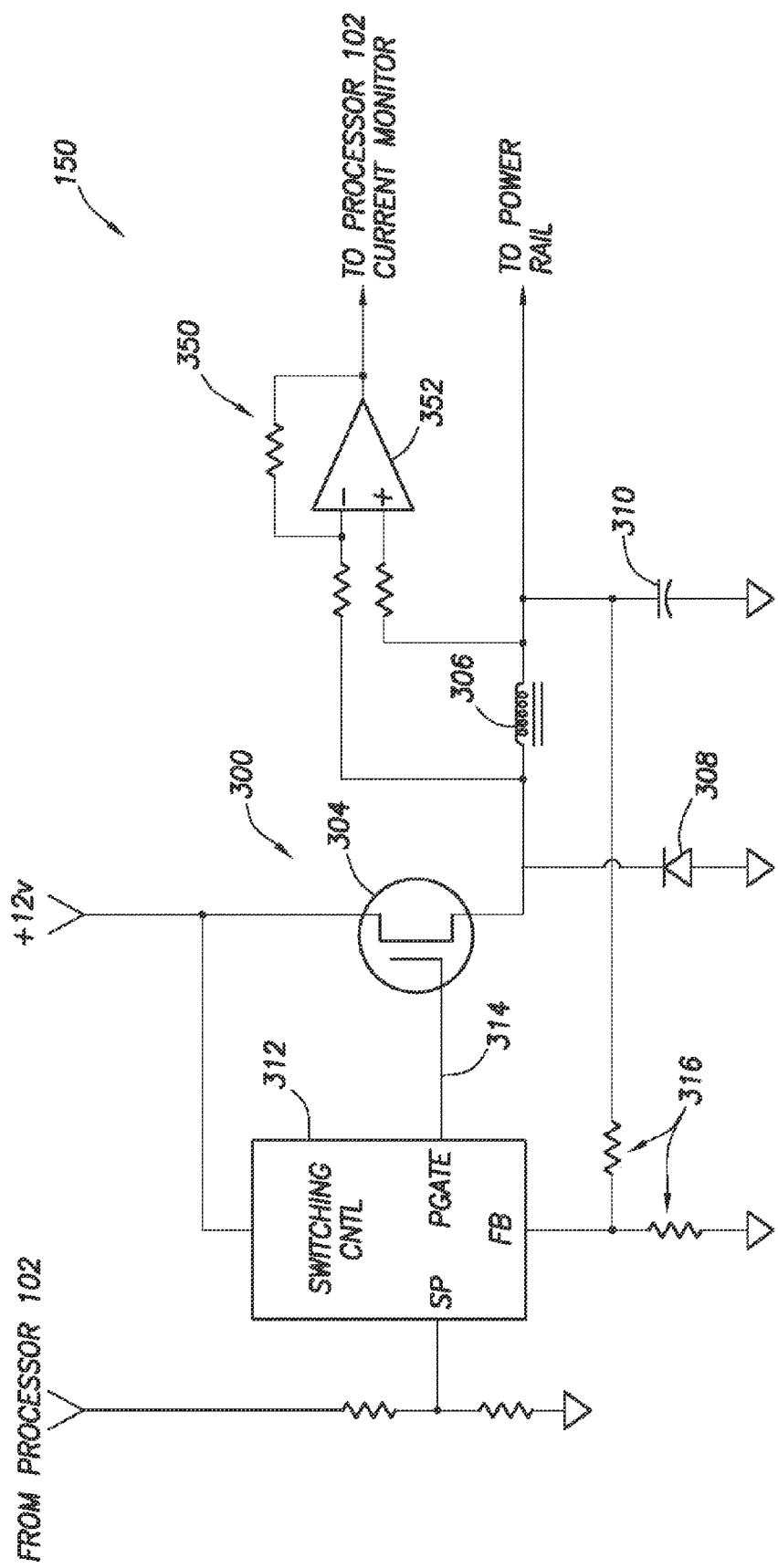
FIG. 3 shows an electrical schematic of a voltage regulator circuit in accordance with at least some embodiments.

FIG. 3 shows an electrical diagram of an illustrative voltage regulator circuit 150. In particular, the voltage regulator circuit 150 may comprise switching-type regulator 300. Although the switching-type regulator 300 is shown as a single stage, in some cases multiple switching-type regulators, or combinations of switching-type regulators and linear-type regulators, may be equivalently used depending on the input voltage, output voltage and expected power draw through the voltage regulator circuit 150. The illustrative switching-type regulator 300 comprises a power control device 304 (such as a N-Channel MOSFET) coupled to an inductor 306, a diode 308 and a capacitor 310, all arranged to produce a voltage change (in this example, a voltage reduction or a "buck-type" arrangement). The switching-type regulator 300 also comprises a switching control circuit 312 (such as a DC/DC controller available from Linear Technology of Milpitas, Calif.). The switching control circuit 312 produces a variable duty cycle switching signal 314 (at the illustrative Pgate output) that couples to the gate of the FET 304. For purposes of illustration, the duty cycle is determined by the switching control circuit 312 based a set point provided to the illustrative set point (SP) input provided from the processor 102, and a feedback voltage applied to the illustrative Vfb input through a voltage divider circuit 312. In other cases, a separate set point input may not be provided, in which case further circuitry may be provided to produce an error signal based on the input provided from the processor and the voltage sensed on the output side of the inductor. The switching signal alternately turns the FET 304 on and off, with the on time and off time set by the duty cycle of the switching signal. Thus, the switching-type regulator 300 and related circuitry provide variable set point closed loop control of the output power signal, with the output voltage ranging from 0.75V to 1.5V in this example.

In order measure the electrical current actually drawn by the processor, the voltage regulator circuit 150 in accordance with at least some embodiments further comprises an amplifier circuit 350. In the illustrative case of FIG. 3, the amplifier circuit 350 comprises an operational amplifier 352 configured as a "difference" or "balanced" amplifier with respect to the voltage drop across the inductor 306. In other embodiments, a precision resistor may be coupled within the circuit, and the voltage drop across the precision resistor used to indicate electrical current flow. The amplifier circuit 350 measures the current actually drawn, and sends an indication to the processor 102 of the electrical current drawn. Depending on the closed-loop gain of the illustrative operational amplifier 352, the indication sent to the processor 102 may be controlled to under-report, or over-report, as desired.

Figure 4:
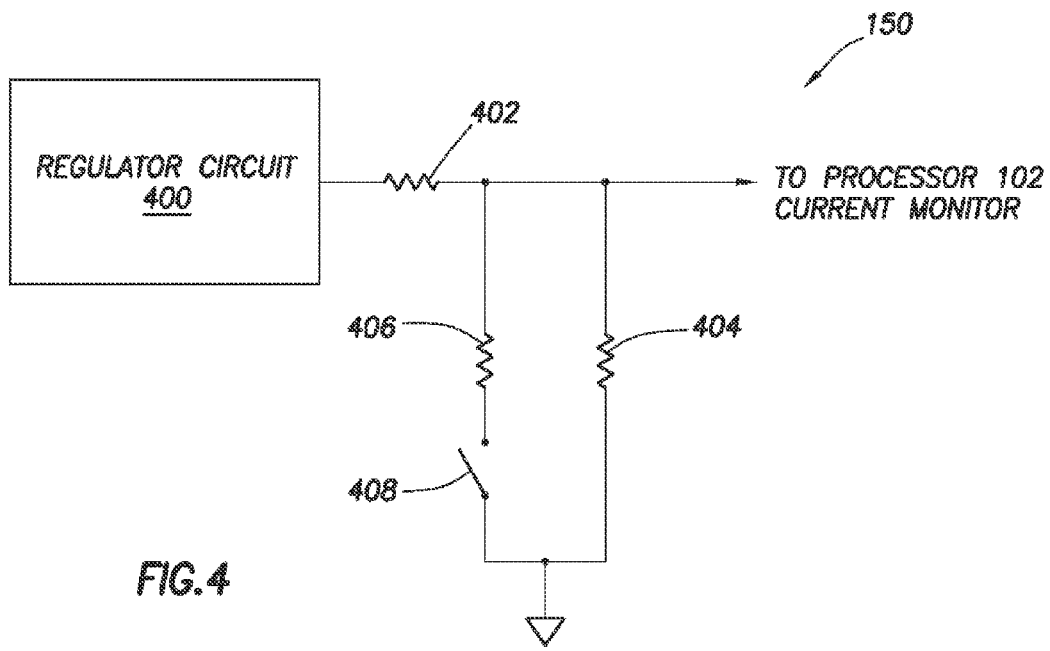
FIG. 4 shows a voltage regulator circuit in accordance with at least some embodiments.

FIG. 4 illustrates yet still further embodiments of a voltage regulator circuit 150. In particular, FIG. 4 shows a regulator circuit 400, such as a voltage regulator circuit configured to accurately report electrical current drawn to the processor 102 (through the resistor network of resistors 402 and 404). FIG. 4 does not show the internal components of the regulator circuit 400 so as not to unduly complicate the figure, and to illustrate that substantially any existing design of a voltage regulator circuit 150 may be modified to achieve the differences in reporting as taught herein. For example, a designer may start with such an existing circuit 400, and modify the circuit to report differently. In order to configure the circuit to under-report, an additional resistor 406 and switch 408 may be added to the resistor network. The switch may be a mechanical switch, or the switch may be electrically operated (e.g., a relay or a transistor). When switch 408 is conducting, the additional resistance of resistor 406 in parallel with resistor 404 lowers the resistance in that portion of the voltage divider, thus lowering the voltage (and reducing the electrical current) reported to the processor 102 indicating electrical current drawn on the power rail. For over-reporting the additional resistor would be selectively placed in parallel with resistor 402.

Figure 5:
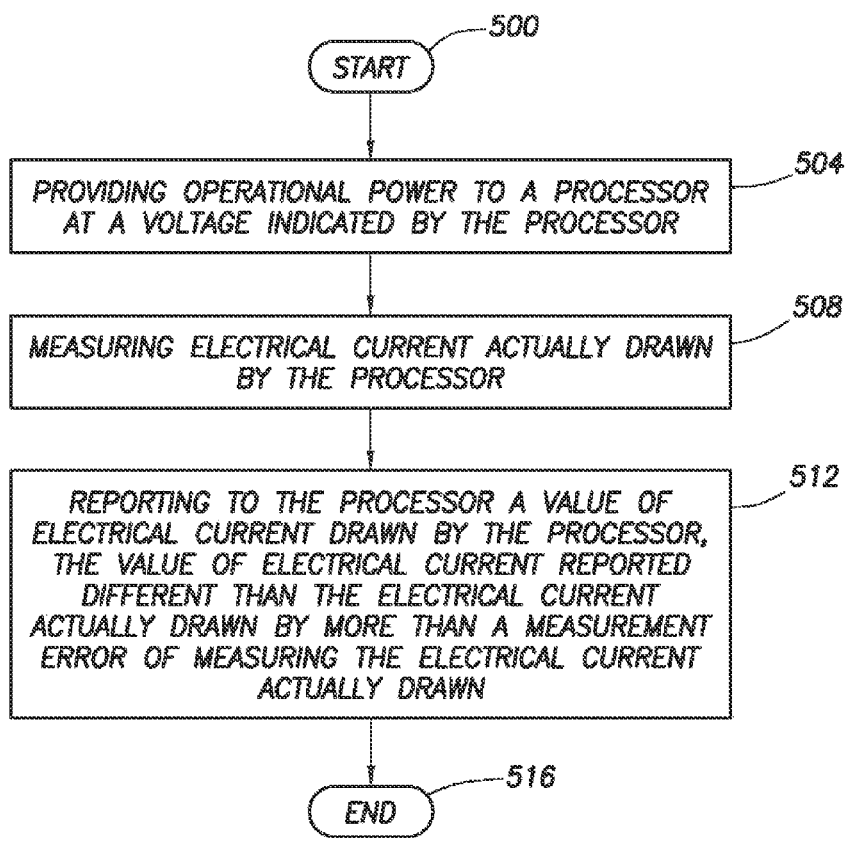
FIG. 5 shows a method in accordance with at least some embodiments.

FIG. 5 illustrates a method in accordance with at least some embodiments. In particular, the method starts (block 500) and proceeds to providing operational power to a processor at a voltage indicated by the processor (block 504). While providing, the method involves measuring electrical current actually drawn by the processor (block 508). Based on the measurement, the method comprises reporting to the processor a value of electrical current drawn by the processor, the value of electrical current reported different than the electrical current actually drawn by more than a measurement error of measuring the electrical current actually drawn (block 512), and the method ends (block 516).

The above discussion is meant to be illustrative of the principles and various embodiments of the present invention. Numerous variations and modifications will become apparent to those skilled in the art once the above disclosure is fully appreciated. For example, the temperature sensing ability of the processor need not be present. Electrical current drawn by the processor could be under-reported in situations where the processor cannot sense its silicon temperatures, so long as other mechanisms are in place to ensure the processor does not overheat. It is intended that the following claims be interpreted to embrace all such variations and modifications.

What is claimed is:

1. A method comprising:
providing, from a voltage regulator circuit, operational power to a processor of a computer system at a voltage indicated by the processor;
measuring, by the voltage regulator circuit, electrical current actually drawn by the processor; and
providing, from the voltage regulator circuit to the processor, a value of electrical current to have been drawn by the processor based on the electrical current actually drawn by the processor, the value of the electrical current to have been drawn and a value of the electrical current actually drawn being different by more than a measurement error of measuring the electrical current actually drawn.

2. The method of claim 1, wherein providing the value of the electrical current to have been drawn includes providing the value of the electrical current to have been drawn to be less than the value of the electrical current actually drawn.

3. The method of claim 1, wherein providing the value of the electrical current to have been drawn includes providing the value of the electrical current to have been drawn to be different by at least 5% of the value of the electrical current actually drawn.

4. The method of claim 1, further comprising:
receiving, from the processor by the voltage regulator circuit, a signal corresponding to the voltage indicated by the processor; and
wherein providing the operational power to the processor includes providing the operational power based on the received signal from the processor.

5. The method of claim 1, wherein the voltage regulator circuit includes an amplifier circuit, and wherein measuring the electrical current actually drawn includes using the amplifier circuit to measure the electrical current actually drawn.

6. An electronic device, comprising:
a processor; and
a voltage regulator circuit, coupled to the processor, to:
receive, from the processor, a first signal indicative of a requested voltage;
provide the requested voltage to the processor based on the first signal;
measure an amount of electrical current actually drawn by the processor; and
send, to the processor, a second signal indicative of an amount of electrical current to have been drawn by the processor based on the amount of the electrical current actually drawn by the processor, the amount of the electrical current to have been drawn and the amount of the electrical current actually drawn being different by more than a measurement error of measuring the amount of the electrical current actually drawn by the processor.

7. The electronic device of claim 6, wherein the amount of the electrical current to have been drawn is lower than the amount of the electrical current actually drawn by the processor.

8. The electronic device of claim 6, wherein the amount of the electrical current to have been drawn is less than 95% of the amount of the electrical current actually drawn by the processor.

9. The electronic device of claim 6, wherein the voltage regulator circuit comprises:
a switching control circuit to receive the first signal indicative of the requested voltage from the processor; and
an amplifier circuit to (i) measure the amount of the electrical current actually drawn by the processor, and (ii) to generate the second signal indicative of the amount of the electrical current to have been drawn based on the amount of the electrical current actually drawn by the processor.

10. The electronic device of claim 6, wherein the second signal is at least one of: (i) an analog signal whose electrical current amplitude is indicative of the amount of electrical current to have been drawn, (ii) an analog signal whose voltage amplitude is indicative of the amount of electrical current to have been drawn, or (iii) a digital signal comprising a value indicative of the amount of electrical current to have been drawn.

11. The electronic device of claim 6, wherein the processor is a main processor of the electronic device.

12. The electronic device of claim 6, further comprising:
a main processor different than the processor coupled to the voltage regulator circuit.

13. A voltage regulator circuit, comprising:
a control circuit to receive, from a processor, a first signal indicative of a requested voltage;
a regulator circuit to provide the requested voltage to the processor based on the first signal via a power line; and
an amplifier circuit to (i) measure an amount of electrical current actually drawn by the processor via the power line, and (ii) send, to the processor, a second signal indicative of an amount of electrical current to have been drawn by the processor based on the amount of the electrical current actually drawn by the processor, the amount of the electrical current to have been drawn and the amount of the electrical current actually drawn being different by more than a measurement error of measuring the amount of the electrical current actually drawn by the processor.

14. The voltage regulator circuit of claim 13, wherein the amount of the electrical current to have been drawn is lower than the amount of the electrical current actually drawn by the processor.

15. The voltage regulator circuit of claim 13, wherein the amplifier circuit measures the amount of electrical current actually drawn by the processor by measuring a voltage drop across a circuit element of the regulator circuit.

* * * * *